US009202277B2

(12) United States Patent
Liu et al.

(10) Patent No.: US 9,202,277 B2
(45) Date of Patent: Dec. 1, 2015

(54) DEVICE FOR DETERMINING DISAPPEARING DIRECTION AND METHOD THEREOF, APPARATUS FOR VIDEO CAMERA CALIBRATION AND METHOD THEREOF

(75) Inventors: Yuyu Liu, Beijing (CN); Zhi Nie, Beijing (CN)

(73) Assignee: Sony Corporation, Tokyo (JP)

( * ) Notice: Subject to any disclaimer, the term of this patent is extended or adjusted under 35 U.S.C. 154(b) by 760 days.

(21) Appl. No.: 13/462,210

(22) Filed: May 2, 2012

(65) Prior Publication Data

US 2012/0293663 A1    Nov. 22, 2012

(30) Foreign Application Priority Data

May 16, 2011    (CN) .......................... 2011 1 0137206

(51) Int. Cl.
| H04N 5/33 | (2006.01) |
| H04N 5/225 | (2006.01) |
| H04N 3/20 | (2006.01) |
| G06T 7/00 | (2006.01) |
| G06T 7/20 | (2006.01) |
| G06T 3/00 | (2006.01) |

(52) U.S. Cl.
CPC ............ *G06T 7/0018* (2013.01); *G06T 3/0031* (2013.01); *G06T 7/004* (2013.01); *G06T 7/2033* (2013.01); G06T 2207/20021 (2013.01); G06T 2207/20076 (2013.01); G06T 2207/30232 (2013.01); G06T 2207/30241 (2013.01)

(58) Field of Classification Search
None
See application file for complete search history.

(56) References Cited

U.S. PATENT DOCUMENTS

| 4,672,557 | A * | 6/1987 | Tamura et al. ................ 356/401 |
| 6,191,704 | B1 * | 2/2001 | Takenaga et al. ............. 340/903 |
| 6,270,459 | B1 * | 8/2001 | Konofagou et al. .......... 600/449 |
| 7,133,537 | B1 * | 11/2006 | Reid ............................ 382/103 |
| 2006/0239506 | A1 * | 10/2006 | Zhang et al. ................. 382/103 |
| 2008/0112646 | A1 * | 5/2008 | Kitaura et al. ............... 382/286 |
| 2012/0093225 | A1 * | 4/2012 | Kubo et al. .............. 375/240.16 |
| 2012/0105578 | A1 * | 5/2012 | Ohmiya et al. ................ 348/36 |

* cited by examiner

*Primary Examiner* — Joseph Ustaris
*Assistant Examiner* — Talha Nawaz
(74) *Attorney, Agent, or Firm* — Oblon, McClelland, Maier & Neustadt, L.L.P.

(57) ABSTRACT

A disappearing direction determination device and method, a video camera calibration apparatus and method, a video camera and a computer program product are provided. The device comprises: a moving target detecting unit for detecting in the video image a moving target area where a moving object locates; a feature point extracting unit for extracting at least one feature point on the moving object in the detected moving target area; a moving trajectory obtaining unit for tracking a movement of the feature point in a predetermined number of video image frames to obtain a movement trajectory of the feature point; and a disappearing direction determining unit for determining, according to the movement trajectories of one or more moving objects in the video image, a disappearing direction pointed by a major moving direction of the moving objects. Thus, a disappearing direction and video camera gesture parameters can be determined accurately.

8 Claims, 14 Drawing Sheets

DEVICE FOR DETERMINING DISAPPEARING DIRECTION AND METHOD THEREOF, APPARATUS FOR VIDEO CAMERA CALIBRATION AND METHOD THEREOF

TECHNICAL FIELD OF THE INVENTION

The invention relates to a device for determining a disappearing direction and method thereof, device for video camera calibration and method thereof, and a video camera using the method and the device.

BACKGROUND ART OF THE INVENTION

Video monitoring systems have been widely used in various fields, such as, roads, parking lots, banks, marketplaces, etc. They obtain three-dimensional space information from a two-dimensional image shot by a video camera, such as a speed of a moving object, a length of a vehicle, a height of a person, etc. In order to obtain three-dimensional coordinates corresponding to pixels in the two-dimensional image to thereby infer information in the real world from the shot two-dimensional image, the video camera needs to be calibrated, that is, determining a gesture of the video camera relative to the ground (a rotation angle, a height, etc. of the video camera). As compared with the manual calibration, a video camera calibration is the trend of developing of the video camera calibration in view of workload of personnel and a measuring difficulty.

Generally, the video camera calibration is performed according to a three-dimensional disappearing direction of the three-dimensional world in the video camera coordinate system. In the existing technology, the disappearing direction is estimated mainly based on line segments obtained by edge detection in the video image.

SUMMARY OF THE INVENTION

However, when the video image lacks excessively edges, or although there are a lot of edges, there are a lot of noise segments, an accurate estimation cannot be obtained stably by estimating the disappearing direction based on line segments obtained by edge detection in the video image.

In addition, even when enough number of edges can be detected to thereby obtain enough line segments, in the existing technology, the system is heavily loaded in computing because an initial estimation of the disappearing direction is performed by using those line segments which are not grouped.

In view of the above deficiencies, the invention aims to provide a device of and a method for determining a disappearing direction, a video camera calibration method and a device, and a video camera using the methods and the devices, such that an accuracy of determining the disappearing direction can be ensured even if a smaller number of edges can be detected in the image. Furthermore, the computing amount of estimating the disappearing direction can be reduced greatly.

According to an embodiment of the invention, a device for determining a disappearing direction is provided, the device comprising: a moving target detecting unit configured to detect in a plurality of video images a moving target area where a moving object locates; a feature point extracting unit configured to extract at least one feature point on the moving object in the detected moving target area; a moving trajectory obtaining unit configured to track a movement of the feature point in a predetermined number of video image frames to obtain a movement trajectory of the feature point; and a disappearing direction determining unit configured to determine, according to the movement trajectories of one or more moving objects in the video images, a disappearing direction pointed by a major moving direction of the moving objects.

According to an embodiment of the invention, an apparatus for video camera calibration is provided, the apparatus comprising: a device for determining a disappearing direction based on a plurality of video images shot by a video camera to be calibrated, the device comprising: a moving target detecting unit configured to detect in the video images a moving target area where a moving object locates, a feature point extracting unit configured to extract at least one feature point on the moving object in the detected moving target area, a moving trajectory obtaining unit configured to track a movement of the feature point in a predetermined number of video image frames to obtain a movement trajectory of the feature point, and a disappearing direction determining unit configured to determine, according to the movement trajectories of one or more moving objects in the video images, a disappearing direction pointed by a major moving direction of the moving objects; and a video camera calibration device configured to determine a gesture of the video camera relative to the ground by using the disappearing direction calculated by the device for determining a disappearing direction.

According to an embodiment of the invention, a method of determining a disappearing direction is provided, the method comprising: detecting in a plurality of video images a moving target area where a moving object locates; extracting at least one feature point on the moving object in the detected moving target area; tracking a movement of the feature point in a predetermined number of video image frames to obtain a movement trajectory of the feature point; and according to the movement trajectories of one or more moving objects in the video images, determining a disappearing direction pointed by a major moving direction of the moving objects.

According to an embodiment of the invention, a video camera calibration method is provided, the method comprising: determining a disappearing direction based on a plurality of video images shot by a video camera to be calibrated, by the steps of detecting in the video images a moving target area where a moving object locates, extracting at least one feature point on the moving object in the detected moving target area, tracking a movement of the feature point in a predetermined number of video image frames to obtain a movement trajectory of the feature point, and according to the movement trajectories of one or more moving objects in the video images, determining a disappearing direction pointed by a major moving direction of the moving objects; and determining a gesture of the video camera relative to the ground by using the determined disappearing direction.

According to an embodiment of the invention, a device for determining a disappearing direction is provided, the device comprising: an edge-detection unit configured to detect a plurality of edges of one or more objects in a video image to obtain corresponding line segments on the objects; an initial estimating unit configured to group the line segments into a plurality of line segment groups by a predetermined rule, to initially estimate the disappearing direction according to the plurality of line segment groups and obtain an initial estimation of the disappearing direction; a closest line segment selecting unit configured to select at least one line segment which is closest to the initial estimation from a predetermined number of line segment groups among all the line segment groups; and a disappearing direction obtaining unit configured to determine the disappearing direction using the selected line segment.

According to an embodiment of the invention, an apparatus for video camera calibration is provided, the apparatus comprising: a device for determining a disappearing direction based on a video image shot by a video camera to be calibrated, the device comprising: an edge-detection unit configured to detect a plurality of edges of one or more objects in the video image to obtain corresponding line segments on the object, an initial estimating unit configured to group the line segments into a plurality of line segment groups by a predetermined rule, to initially estimate a disappearing direction according to the grouped line segments and obtain an initial estimation of the disappearing direction, a closest line segment selecting unit configured to select at least one line segment which is closest to the initial estimation from a predetermined number of line segment groups among all the line segment groups, and a disappearing direction obtaining unit configured to determine the disappearing direction using the selected line segment; and a video camera calibration unit configured to determine a gesture of the video camera relative to the ground by using the disappearing direction calculated by the device for determining a disappearing direction.

According to an embodiment of the invention, a method of determining a disappearing direction is provided, the method comprising: detecting a plurality of edges of one or more objects in a video image to obtain corresponding line segments on the objects; grouping the line segments into a plurality of line segment groups by a predetermined rule, and initially estimating the disappearing direction according to the plurality of line segment groups to obtain an initial estimation of the disappearing direction; selecting at least one line segment which is closest to the initial estimation from a predetermined number of line segment groups among all the line segment groups; and determining the disappearing direction by using the selected line segments.

According to an embodiment of the invention, a video camera calibration method is provided, the method comprising: determining a disappearing direction based on a video image shot by a video camera to be calibrated, by the steps of detecting a plurality of edges of one or more objects in the video image to obtain corresponding line segments on the objects, grouping the line segments into a plurality of line segment groups by a predetermined rule, and initially estimating the disappearing direction according to the plurality of line segment groups to obtain an initial estimation of the disappearing direction, and selecting at least one line segment which is closest to the initial estimation from a predetermined number of line segment groups among all the line segment groups; and determining the disappearing direction by using the selected line segments; and determining a gesture of the video camera relative to the ground by using the determined disappearing direction.

According to an embodiment of the invention, a computer program product is provided, the computer program comprises program codes which, when executed by a processor of a computer, cause the processor to perform the following steps of: detecting in a plurality of input video images a moving target area where a moving object locates; extracting at least one feature point on the moving object in the detected moving target area; tracking a movement of the feature point in a predetermined number of video image frames to obtain a movement trajectory of the feature point; and according to the movement trajectories of one or more moving objects in the video images, determining a disappearing direction pointed by a major moving direction of the moving objects.

According to an embodiment of the invention, a computer program product is provided, the computer program comprises program codes which, when executed by a processor of a computer, cause the processor to perform the following steps of: detecting a plurality of edges of one or more objects in an input video image to obtain corresponding line segments on the objects; grouping the line segments into a plurality of line segment groups by a predetermined rule, and initially estimating the disappearing direction according to the plurality of line segment groups to obtain an initial estimation of the disappearing direction; selecting at least one line segment which is closest to the initial estimation from a predetermined number of line segment groups among all the line segment groups; and determining a disappearing direction by using the selected line segments.

A video camera which uses the above various methods and devices is provided according to other embodiments of the invention.

According to the embodiments of the invention, a three-dimensional disappearing direction is determined using a movement trajectory of the feature point in video image, such that the accurate estimation of disappearing direction can be obtained even when the image includes very few edges. In addition, estimating initial direction of three-dimensional disappearing direction after grouping the line segments obtained from image reduces greatly the computing workload of the system. Also, the accuracy of video camera calibration is improved, and the computing amount of the calibration system is reduced.

BRIEF DESCRIPTION OF THE DRAWINGS

The above and other objects, features and advantages of the invention will be understood better by referring to the descriptions of the embodiments of the invention in conjunction with the drawings. In the drawings, the same or corresponding technical features or components are denoted by the same or corresponding reference signs. Size and relative position of the unit are not necessarily drawn in ratio in the drawings.

DETAILED DESCRIPTION OF THE SPECIFIC EMBODIMENTS

Figure 1:
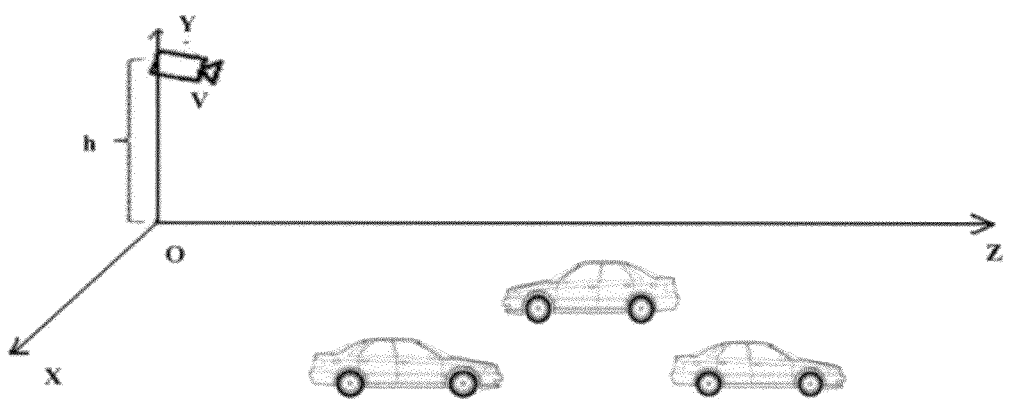
FIG. 1 is a schematic view showing an application field of the invention in which a road monitoring is taken as an example.

The embodiments of the present invention are discussed hereinafter in conjunction with the drawings. It shall be noted that representation and description of components and processes unrelated to the present invention and well known to one of ordinary skill in the art are omitted in the drawings and the description for the purpose of clarity.

Hereinafter, the embodiments of the invention are described by taking a road monitoring system as an example to facilitate the description. FIG. 1 is a schematic view showing an application field of the invention in which a road monitoring is taken as an example. It shall be understood that the example is illustrative, and application fields of the method of and device for determining disappearing direction, the video camera calibration method and the device thereof, and the video camera using the same are not limited thereto. For example, the video camera in the implementation system and any other video capturing devices using this invention may further be set up at the gate of the public places like the shopping mall, in the underground parking, etc. so as to monitor and analyze image in those fields. Furthermore, it needs to state clearly that the description and claims of the application use a phrase "a predetermined number of", which indicates a number that can be determined by those skilled in the art from the existing knowledge and experience based on specific requirements, for example, when there exist enough software and hardware resources, a large number of samples may be selected to process to obtain better result, while there is limited resource, a small number of samples may be selected to process to avoid excessive calculating amount or delay, wherein it is not necessary to define specifically the number selected here.

As shown in FIG. 1, a video camera V is mounted on a camera rack at the side of the road, and the height of the video camera to the ground is h. To measure accurately a speed and a size of the vehicle, the video camera calibration needs to be performed to determine a gesture of the video camera relative to the ground. The video camera calibration is performed according to the three-dimensional disappearing direction of the three-dimensional world (ground) in the video camera coordinate system. In the embodiment shown in FIG. 1, the three-dimensional disappearing directions are coordinate axes OX, OY, OZ directions of the coordinate system of the ground relative to the video camera. Hereinafter, the disappearing direction OX may be referred to as disappearing direction of the ground horizontal direction, disappearing direction OZ may be referred to as a disappearing direction where the ground extends to distance, and the disappearing direction OY may be referred to as a disappearing direction perpendicular to the ground plane (XOZ plane). Generally, after the disappearing directions OX and OZ are obtained, the disappearing direction OY may be obtained by an outer product of the OZ and OX according to a principle that three axes of the coordinate system are orthogonal to each other. Therefore, seeking disappearing direction is focused on how to obtain the ground horizontal disappearing direction OX and the disappearing direction OZ where the ground extends to distance.

In view of the existence of the movement objects in most of the monitored fields, the invention proposes a special method for such fields for determining stably and accurately the disappearing direction OZ where the ground extends to distance by making use of the moving objects such as moving vehicle or passerby on the ground.

Figure 2:
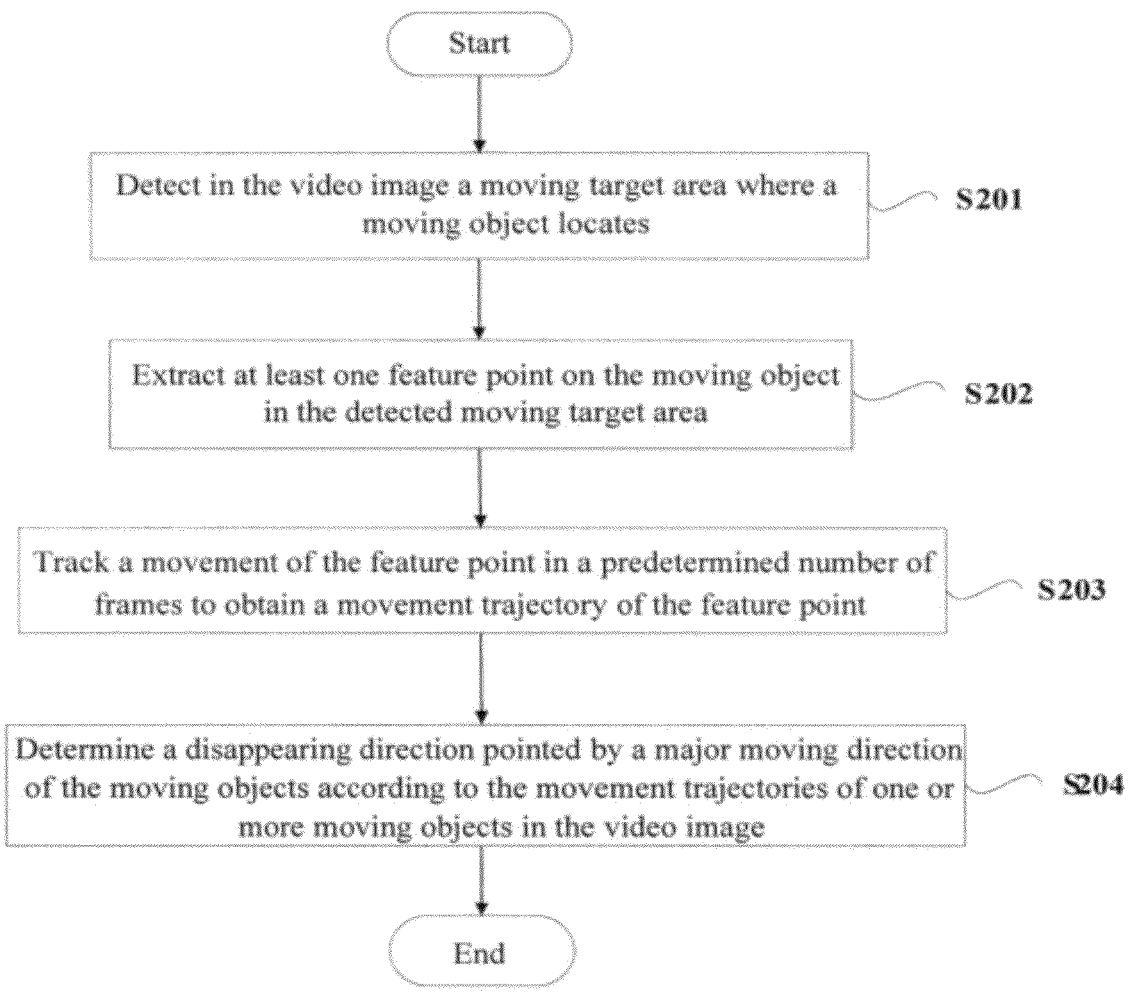
FIG. 2 is a flow chart showing a method of determining a disappearing direction according to an embodiment of the invention.

FIG. 2 is a flow chart showing a method of determining a three-dimensional disappearing direction according to an embodiment of the invention.

In step S201, detect in the video image shot by the video camera V a moving target area where a moving object locates. Detecting in an image a moving target area of a moving object may be completed by the known moving detecting or object detecting techniques. As to a specific method, a reference can be made to "Motion segmentation using occlusions", A. S. Ogale, C. Fermüller and Y. Aloimonos, IEEE Transactions on Pattern Analysis and Machine Intelligence, vol. 27, no. 6, 988-992, 2005 and "Robust real-time object detection", P. Viola and M. Jones, International Journal of Computer Vision, 2001.

In step S202, extract a feature point on the moving object in the detected moving target area. The extracted feature point on the moving object may include any position or pattern on the moving object convenient to be identified from the video image. For example, a corner of the moving object, or a corner of a texture of the moving object. Specific to the road monitoring, the feature point may be an end point of the contour of the vehicle body, a logo of the vehicle, a rearview mirror, an end point or a cross point of pattern lines on the vehicle body, etc. To make an estimation of the three-dimensional disappearing direction more accurate, the number of the extracted feature points on each moving object may be made as large as possible, especially when there is less moving object showing in the video image.

As to a specific method of detecting the feature point in an image, a reference can be made to "A combined corner and edge detector", C. Harris and M. Stephens, Proceedings of the 4th Alvey Vision Conference, pp. 147-151, 1988 C.

In step S203, track a movement of the feature point in a predetermined number of frames to obtain a movement trajectory of the feature point and to fit a line segment according to the movement trajectory.

The number of the frames used for tracking the feature point to obtain the movement trajectory of the feature point is determined based on the specific application fields. For example, in road monitoring, the number of the frames may be the number of the frames included in the video which is shot when a vehicle enters the video camera shooting range until the vehicle gets out of the shooting range. Furthermore, the taken length of a video or the number of the frames for tracking the feature point may be predetermined.

In step S203, the most movement trajectories obtained are approximate straight lines. As to the method of fitting a line segment using those approximate lines, a reference can be made to "A Fast Line Finder for Vision-Guided Robot Navigation", K. Kahn, L. Kitchen and E. M. Riseman, IEEE Transactions on Pattern Analysis and Machine Intelligence, 12(11):1098-1102, 1990.

Figure 4:
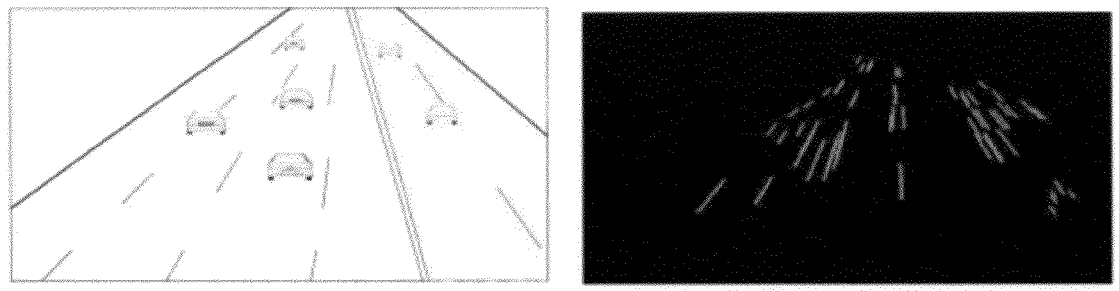
FIG. 4 is a schematic view showing fitting a line segment according to the movement trajectory of the feature points in predetermined number of frames.

FIG. 4 is a schematic view showing fitting a line segment (see white segment at the right side of FIG. 4) according to the movement trajectory of the feature points in the predetermined number of frames. As can be seen from FIG. 4, in the road monitoring system, except for changing direction for changing the lane to the left or right, monitored vehicles mainly go forward along the direction of the road. That is to say, there is a direction along which most vehicles are driven, that is, the major moving direction of the vehicles, and it is the road direction here. Usually, in the moving directions of all the monitored moving objects, a direction along which the largest number of the moving objects move is the major moving direction in the moving directions of the moving objects. However, in view of different number of feature points that may be extracted from different moving objects, the major moving direction in the moving directions of the moving objects may be defined as a direction pointed by the largest number of the line segments. The line segments are from a line segment set which includes line segments fitted according to the movement trajectories of the feature points of all moving objects. In the embodiment, the disappearing direction OZ to be determined is the disappearing direction pointed by the major moving direction of the monitored vehicles. Experiments show that the disappearing direction pointed by the major moving direction will overlay with the disappearing direction of the road when there are enough statistical vehicles. Therefore, the OZ mentioned here may be regarded as the disappearing direction of the road.

So, in step S204, by using the line segments fitted with the movement trajectories of the feature points in step S203, determine a disappearing direction OZ pointed by the major moving direction of the moving directions of the moving objects.

The method of calculating the three-dimensional disappearing direction using the line segment set in the plane image may use the well known methods in the art, such as edge plane normal vector representation, RANSAC method and so on. For example, in the embodiment, based on the line segment set obtained in step S203, a three-dimensional disappearing direction OZ is calculated from every two of all the segments in the segment set using the edge plane normal vector method. The edge plane normal vector method regards two line segments in a two-dimensional image as projections of two parallel lines in the three-dimensional space on the two-dimensional image plane, and obtains one estimation of the three-dimensional disappearing direction OZ by an outer product of the edge plane normal vector (three-dimensional) in case of known perspective transform parameters of a video camera. Then, a final precise OZ may be calculated by applying RANSAC method to all estimations of such OZ. As to the edge plane normal vector, for specific description, a reference can be made to "Video compass", Jana Kosecka and Wei Zhang, In Proc. of ECCV, 2002. As to RANSAC method, for specific description, a reference can be made to "Random Sample Consensus: A Paradigm for Model Fitting with Applications to Image Analysis and Automated Cartography", Martin A. Fischler and Robert C. Bolles, Comm. of the ACM 24: 381-395.

Determining a disappearing direction OZ by using the method of the embodiment shown in FIG. 2 avoids an inaccurate estimation caused by the estimation of the disappearing direction using the edge-detected line segments in case of insufficient number of edges or too many noisy edges. Since the feature point is convenient for identifying and tracking, and the moving direction is relatively stable in a certain period of time, the accuracy of the estimation of the disappearing direction pointed by moving directions is ensured.

Figure 3:
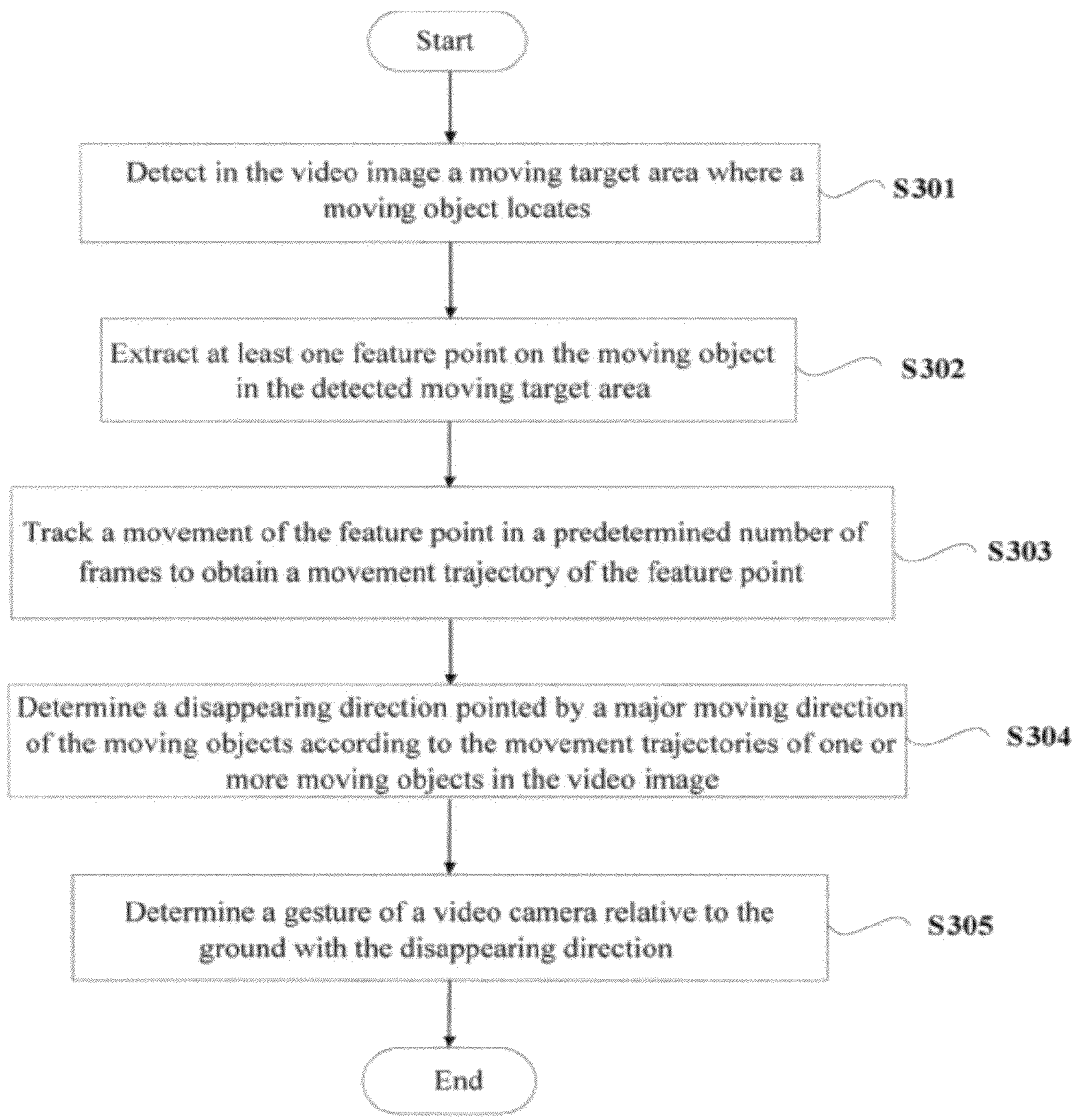
FIG. 3 is a flow chart showing a video camera calibration method according to an embodiment of the invention.

FIG. 3 is a flow chart showing a video camera calibration method according to an embodiment of the invention, wherein, steps S301 to S304 are steps of estimating a disappearing direction pointed by the major moving direction of the moving object based on movement trajectories of moving objects in a video image, for example, processes which are the same as those of steps S201 to S204 shown in FIG. 2 may be used. Therefore, detailed descriptions are omitted here.

In step S305, the disappearing direction OZ determined in step S304 is used for the video camera calibration to determine the gesture of the video camera relative to the ground. Example of determining the video camera gesture parameter based on the disappearing direction will be described later by taking an example.

Figure 6:
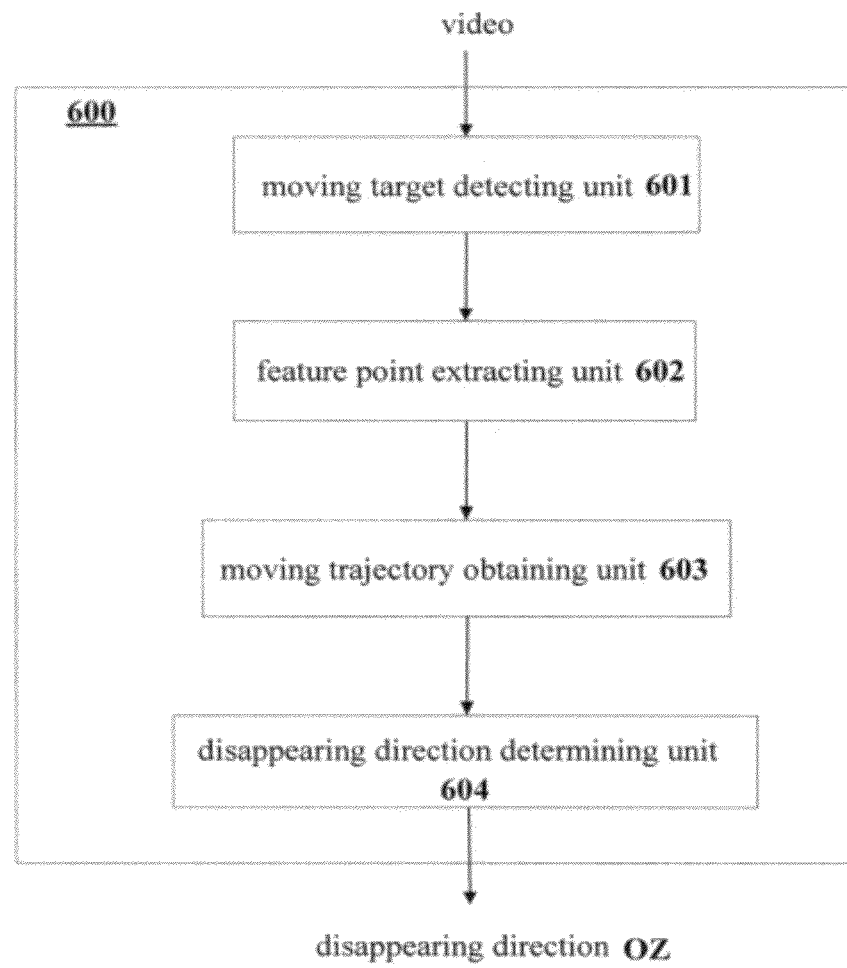
FIG. 6 is a block diagram showing a configuration of a device for determining a disappearing direction according to an embodiment of the invention.

FIG. 6 is a block diagram showing a structure of a device for determining a disappearing direction according to an embodiment of the invention. The disappearing direction determining device 600 comprises a moving target detecting unit 601, a feature point extracting unit 602, a moving trajectory obtaining and segment fitting unit 603 and a disappearing direction determining unit 604.

The moving target detecting unit 601 detects in the input video image shot by a video camera a moving target area where a moving object locates; and provides the detected result to the feature point extracting unit 602.

The feature point extracting unit 602 extracts a feature point on the moving object in the detected moving target area. The feature point may be any position or pattern on the moving object convenient for identifying. For example, a corner of the moving object, or a corner of a texture of the moving object. It is preferable to extract feature points of the moving object as more as possible especially when there is less moving object, so as to ensure the number of line segments for estimating the disappearing direction.

The moving trajectory obtaining and segment fitting unit 603 tracks movements of the feature points in a predetermined number of the frames to obtain the movement trajectories of the feature points and to fit line segments according to the movement trajectories. Then the moving trajectory obtaining and segment fitting unit 603 provides the obtained line segments to the disappearing direction determining unit 604 as a line segment set.

The disappearing direction determining unit 604 determines, by using the line segment set, a disappearing direction pointed by the major moving direction of the moving directions of the moving objects. As stated above, the major moving direction may be understood as a direction pointed by the largest number of the line segments in fitted line segment set. In the embodiment, a disappearing direction is obtained by using the edge plane normal vector and RANSAC method according to the line segment set. It shall be appreciated that any well known method may be further used to obtain a disappearing direction according to the fitted line segment.

Figure 7:
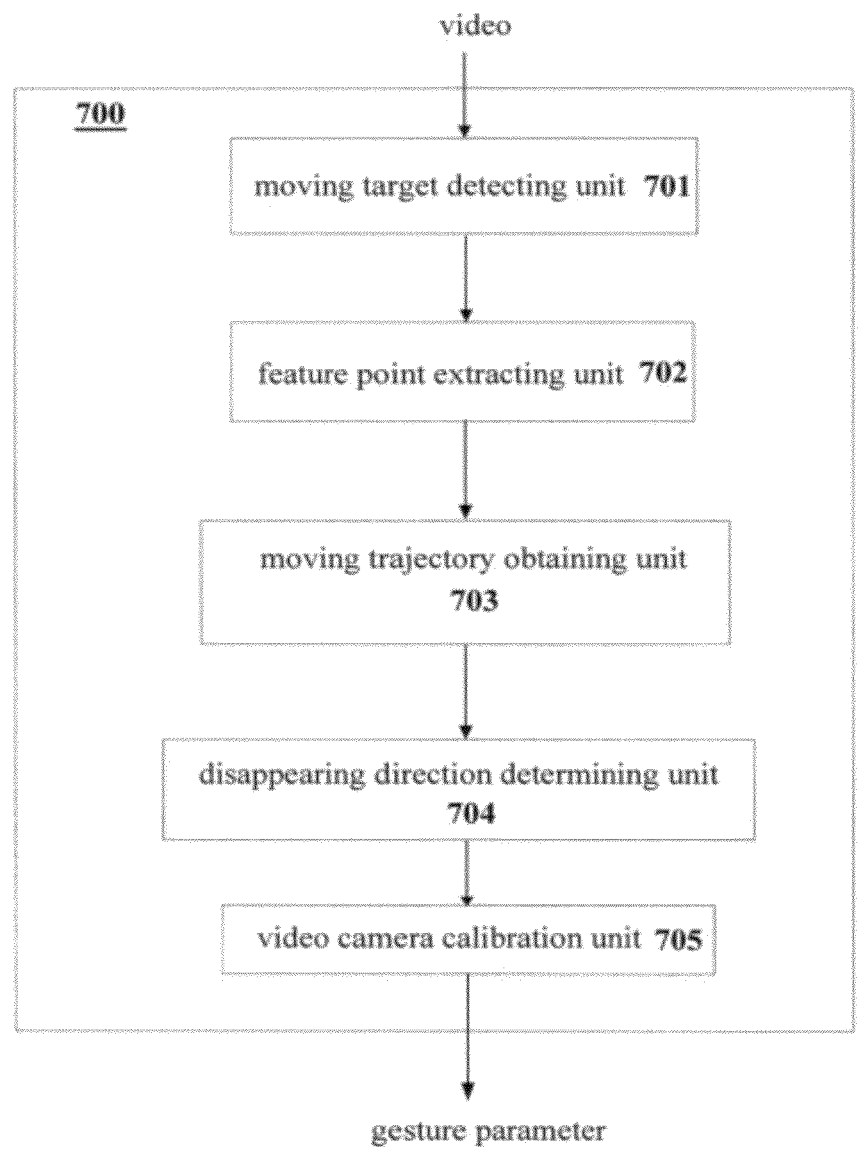
FIG. 7 is a block diagram showing a configuration of an apparatus for a video camera calibration according to an embodiment of the invention.

FIG. 7 is a block diagram showing a structure of an apparatus for a video camera calibration according to an embodiment of the invention. The video camera calibration device 700 comprises a moving target detecting unit 701, a feature point extracting unit 702, a moving trajectory obtaining and segment fitting unit 703, a disappearing direction determining unit 704 and a video camera calibration unit 705, wherein units 701 to 704 are used to extract feature points from the moving objects in the video image, and obtain the disappearing direction OZ according to the line segments fitted according to movement trajectories of the feature points. Units 701 to 704 may have the same structures and functions as those of units 601 to 604 shown in conjunction with FIG. 6. Therefore, detailed descriptions are omitted here.

The video camera calibration unit 705 uses the disappearing direction OZ determined by the disappearing direction determining unit 704 to perform the video camera calibration to determine the gesture of the video camera relative to the ground. Performing the video camera calibration using the disappearing direction obtained according to line segment fitted based on the movement trajectories of feature points avoids the inaccurate calibration when there are less edges or there are too much noisy edges in the video image.

The video camera calibration device according to an embodiment of the invention can be mounted or integrated inside the video camera or attached outside the video camera to process the video images shot by the video camera for the video camera calibration.

Method and device for determining a disappearing direction OZ based on the movement trajectories of the feature points of the moving objects in the video image are presented above by examples. Next, a method for obtaining the ground horizontal disappearing direction OX will be provided.

Figure 8:
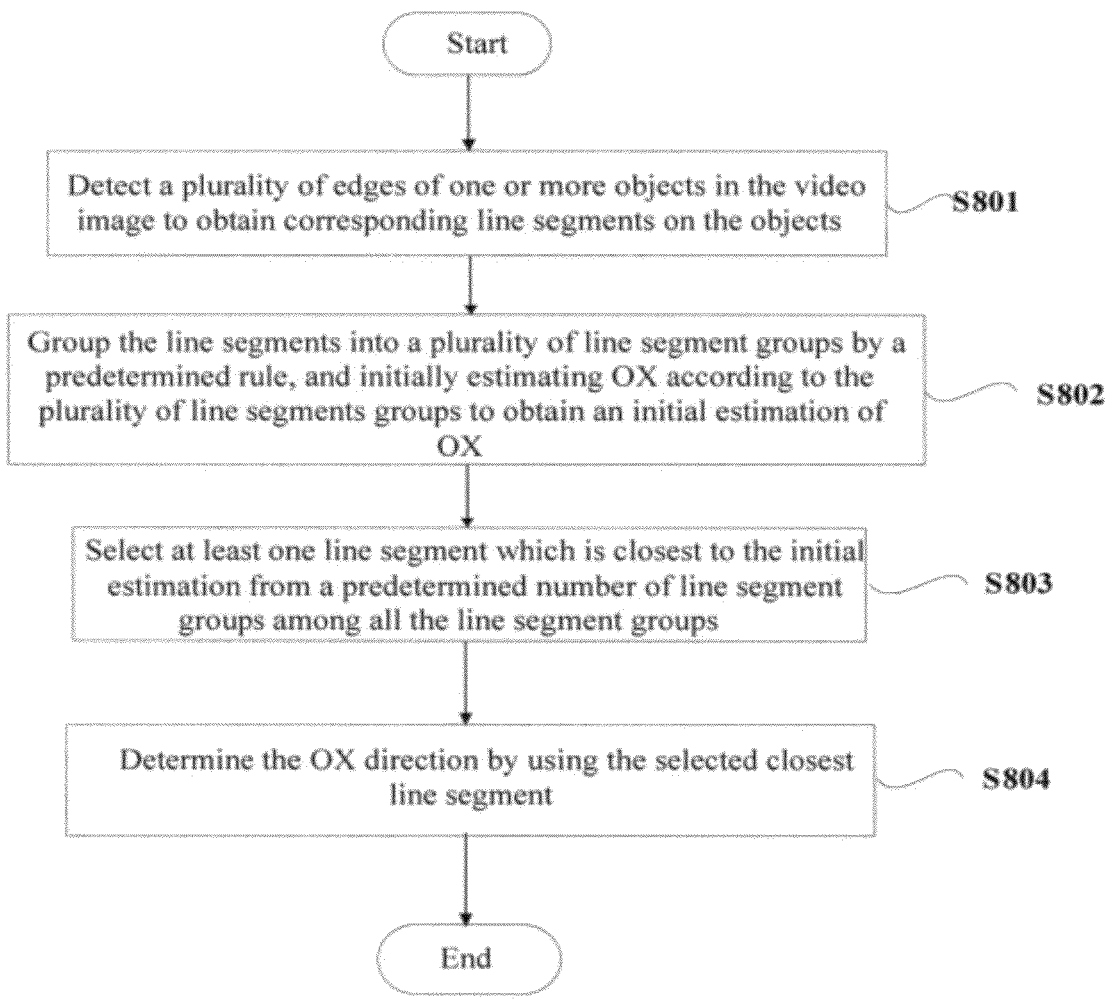
FIG. 8 is a flow chart showing a method of determining a disappearing direction according to an embodiment of the invention.

FIG. 8 is a flow chart showing a method for determining the disappearing direction OX based on the video image according to an embodiment of the invention.

Figure 5:
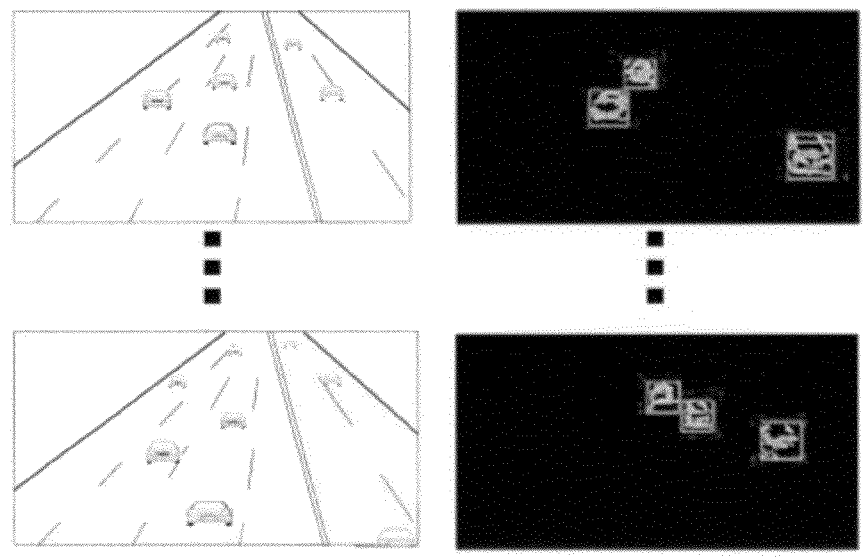
FIG. 5 is a schematic view showing obtaining the edge line segment taking a vehicle as the edge detecting object.

In step S801, detect edges of an object in the video image shot by a video camera to obtain the line segments on the object. The objects for edge detection may be still objects like buildings, or may be moving objects like automobiles. FIG. 5 is a schematic view showing obtaining the edge line segment taking a vehicle as object to be detected (the white segments in blocks at the right side of the figure).

There are relatively less vehicles in the embodiment shown in FIG. 5. In case of a large traffic, a larger number of the line segments may be obtained by edge detection. In such a case, if using the existing technology, the disappearing direction OX is estimated according to all the line segments without any processing, a great deal of noise will be caused, such that it is impossible to estimate OX direction accurately. Meanwhile, the system will endure a quite large computing workload. In view of this, the line segment set obtained by edge detection is grouped by the embodiment of the invention to estimate the disappearing direction OX in a unit of the grouped line segment subset.

Specifically, in step S802, group the line segments obtained in step S801 by a predetermined rule, and initially estimate the disappearing direction OX according to the group of the line segments.

The predetermined rule for grouping used here may be any rule prescribed according to design requirements and application fields. For example, a video image is divided into a number of blocks evenly, and the edge line segments obtained in unit of the divided block are regarded as one group. For another example, the line segments are grouped in a unit of an object which is known to include the edge line segments parallel to the disappearing direction OX. In the embodiment, the line segments may be grouped in a unit of a circumscribed rectangle of the object in the video image. When two circumscribed rectangles overlap each other, it is deemed that object near the video camera blocks the rear one, so intersection portion of two circumscribed rectangles may be excavated from the rear circumscribed rectangle. In the embodiment shown in FIG. 5, the object is the moving object detected from the input video image. In other words, in the embodiment, the detected edge line segments are divided into different groups according to the different automobiles to which the line segments belong.

The invention inventively proposes grouping the line segments, thereby estimating the disappearing direction OX in a unit of the grouped line segment subset, such that computing amount of the system can be reduced effectively. Specifically, a person skilled in the art may initially estimate the disappearing direction OX by various existing initial estimating methods of seeking a disappearing direction. A method of seeking an initial estimation of a disappearing direction OX according to an embodiment of the invention will be introduced by way of an example hereinafter.

For instance, an initial estimation of a disappearing direction may be performed by introducing a vertical restraint using another predetermined disappearing direction perpendicular to the disappearing direction to be estimated. For example, when the initial direction of the disappearing direction OX is estimated, the disappearing direction OX may be initially estimated using the OZ direction which is perpendicular to the OX in case that the OZ direction has been determined by any method (for example, the method described in FIG. 2 or other well known methods for determining the OZ direction).

Figure 9:
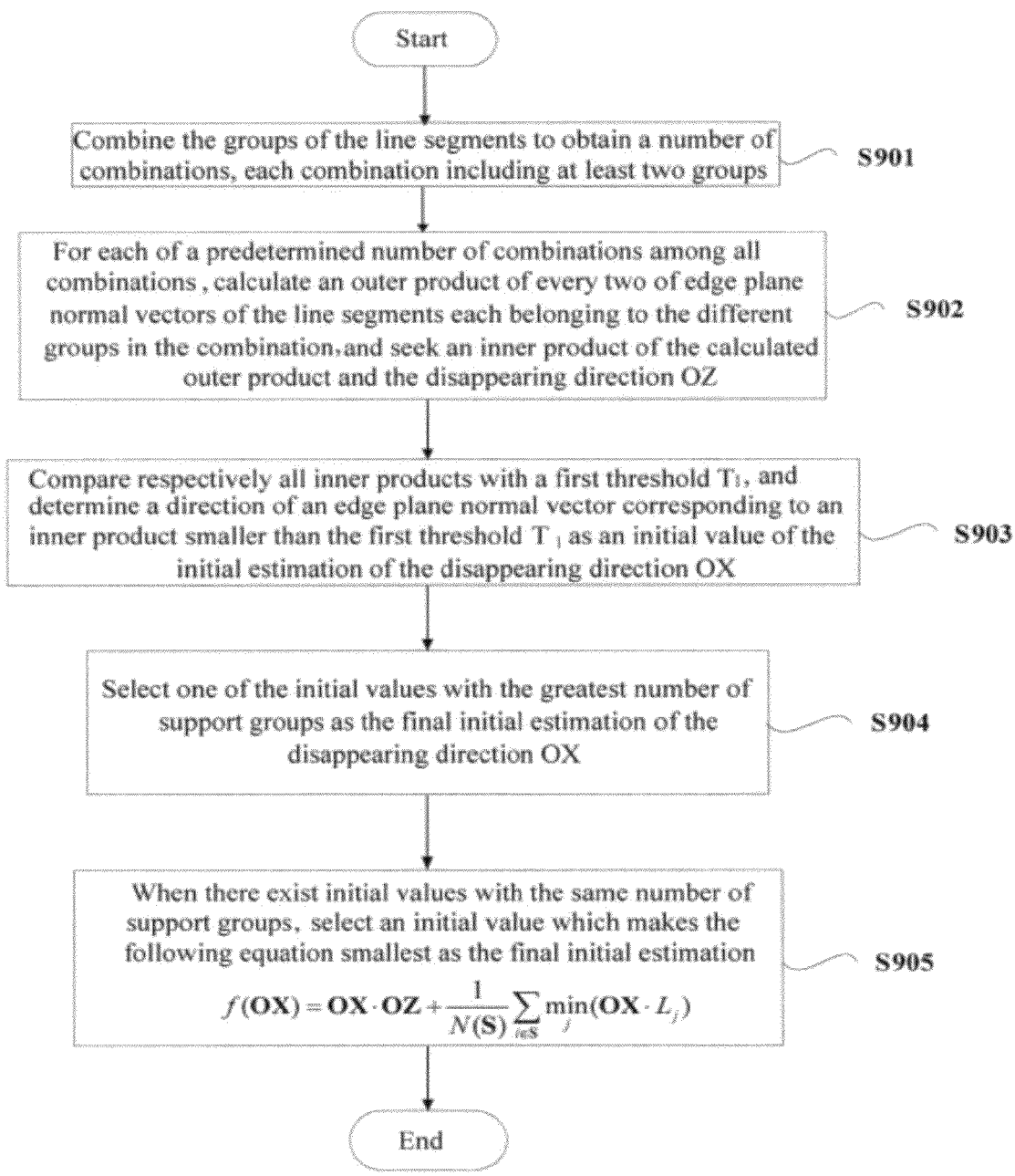
FIG. 9 is a flow chart showing a method for performing a initial estimation on the disappearing direction.

Next, the method of initially estimating the disappearing direction OX using OZ by applying the vertical restraint is explained by referring to FIG. 9. It shall be understood that the example is illustrative only, and the method of initially estimating the OX is not limited thereto, and various methods conventionally used by a person skilled in the art may be used. FIG. 9 is a flow chart showing a method of initially estimating a disappearing direction OX according to an embodiment of the invention.

In step S901, combine various groups of the line segments to obtain a number of combinations, each combination including at least two groups. In the embodiment, every two different groups are combined, each combination being consisted of two groups.

In step S902, with respect to the case that each combination in the embodiment is consisted of two groups, for each of all the combinations, calculate the outer product of every two of the edge plane normal vectors of the line segments separately belong to the different groups in the combination (for example, for group A and group B in a combination, calculate the outer product of every two of edge plane normal vectors of line segments of group A and edge plane normal vectors of line segments of group B respectively), and seek an inner product of the calculated outer product and the disappearing direction OZ perpendicular to the OX. In view of computing amount, the above process may be performed only for a predetermined number of combinations among all the combinations.

Edge plane of a space line is a three-dimensional plane determined by two end points of the line segment and an optical center of the video camera. Correspondingly, the normal vector of the three-dimensional plane is the edge plane normal vector. As to the method of seeking the edge plane normal vector, please make a reference to "Video compass", section 2.1, Jana Kosecka and Wei Zhang, In Proc. of ECCV, 2002.

In step S903, compare respectively all inner products calculated for the predetermined number of combinations with a threshold T1, and determine a direction of an edge plane normal vector corresponding to an inner product smaller than the threshold T1 as an initial value of the initial estimation of the disappearing direction OX.

The magnitude of threshold T1 is close to 0, and a degree that it is close to 0 reflects a degree that the initial value of the initial estimation of the disappearing direction OX is required to be perpendicular to the disappearing direction OZ. In other words, the closer the threshold is to 0, the more perpendicular the initial value of OX is to OZ. It may be selected based on requirement of the preciseness of estimating the disappearing direction, for example, 0.1 may be selected.

Optionally, when each combination includes more than two groups (such as 3 or 4 groups), in steps S902 and S903, the initial value of the initial estimation of the disappearing direction OX may be determined from the number of the groups by using the least square method.

After the initial value of the initial estimation of OX is sought, a final initial estimation of OX may be determined according to the initial value by using various standards and methods based on requirements. For example, the initial value of each of the initial estimation may be added, and then an average value is calculated as the final initial estimation value.

In the embodiment, in step S904, one having the maximum number of the support groups is selected from those initial values as the final initial estimation of the disappearing direction OX. Here, the group satisfying the following condition is referred to as a support group in the invention: seeking an inner product of each of the edge plane normal vectors of all segments in the group and the obtained initial value, a minimum value in the obtained inner products being smaller than a threshold T2.

Selection of threshold T2 is similar to that of threshold T1, and any value close to 0 may be selected according to preciseness requirement of the disappearing direction (of course, it is a positive value).

When there are initial values with the same number of support groups, a standard for selecting an initial value may be set according to requirements. In the embodiment, an initial value which makes a target function smallest may be selected as the final initial estimation, wherein, the target function includes a measurement of perpendicular degree between the initial value of the disappearing direction OX and the disappearing direction OZ, and a measurement of parallel degree between the initial value and a line which is most parallel to the initial value in other the support groups.

For example, in step S905, the following equation (1) is used as the target function to select an initial value which makes the equation (1) the smallest as a final initial estimation of the disappearing direction OX:

$$f(OX) = OX \cdot OZ + \frac{1}{N(S)} \sum_{i \in S} \min_j (OX \cdot L_j) \quad (1)$$

wherein OX is representative of an initial value of an initial estimation of the disappearing direction, OZ is representative of the another disappearing direction perpendicular thereto, N(S) is the number of support groups, $$\sum_{i \in S}$$

is to sum all support groups, $$\min_j (OX \cdot L_j)$$

is to seek a minimum value of inner products of an initial value of OX and edge plane normal vectors of all lines Lj in group i.

By the method shown in FIG. 9, an initial estimation of a disappearing direction is obtained by introducing vertical restraint by another vertical direction OZ perpendicular to the disappearing direction OX. A specific implementation example of the method shown in FIG. 9 will be described hereinafter by referring to FIG. 10.

Figure 10:
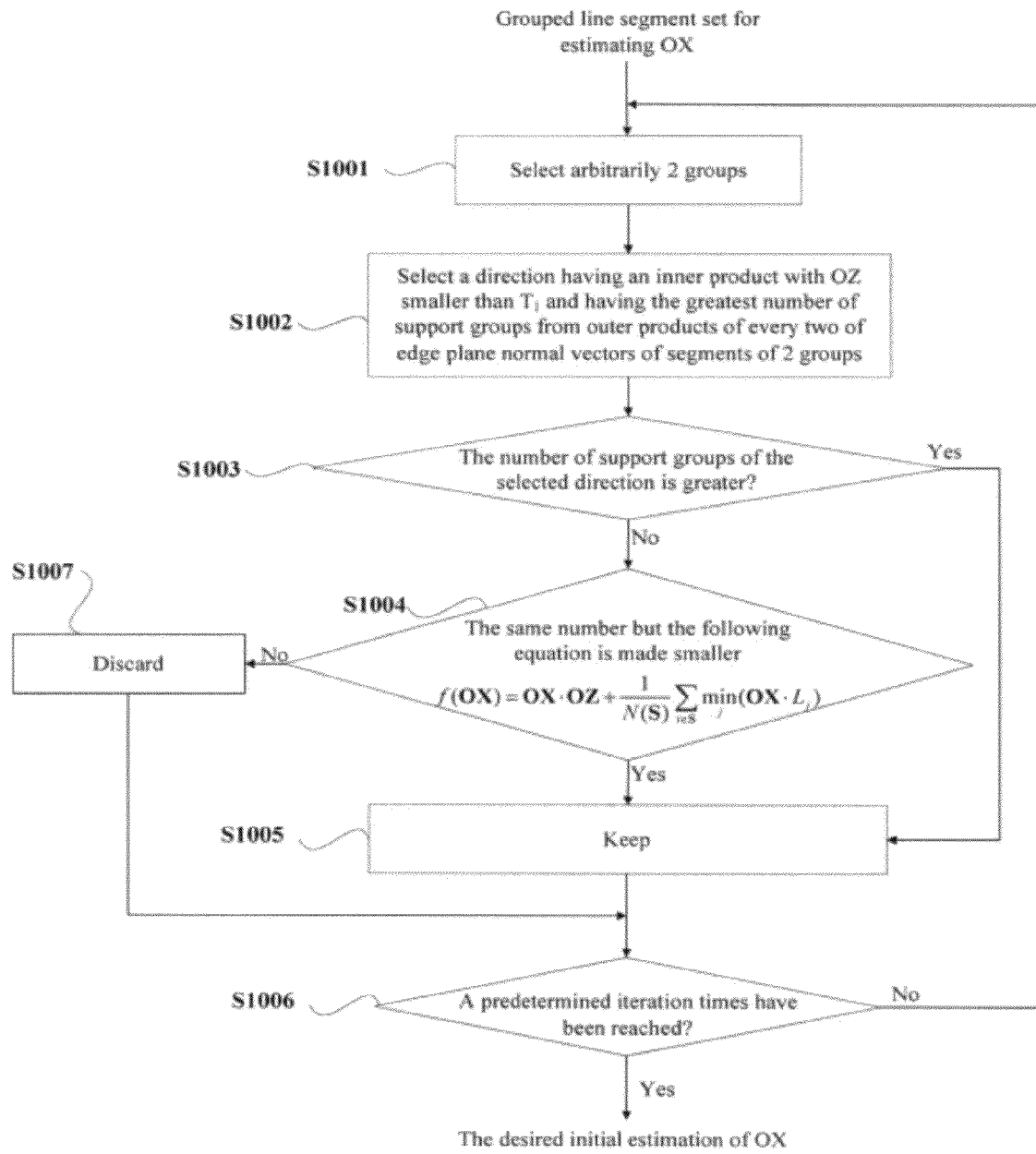
FIG. 10 is a flow chart showing a specific application example of the method of performing the initial estimation on the disappearing direction.

FIG. 10 is a flow chart showing a specific application example of the method of performing initial estimation of OX.

In step S1001, two groups are selected arbitrarily from the groups of the line segment sets for estimating OX. In step S1002, select a direction of a normal vector corresponding to an outer product having an inner product with the known OZ perpendicular to the disappearing direction OX smaller than a threshold T1 and having the maximum number of support groups, from outer product of every two of the edge plane normal vectors of the segments respectively belonging to the two groups.

In step S1003, determine whether the number of the support groups is the maximum in the direction selected in step S1002, if Yes, keep the selected direction (step S1005). If it is determined No in step S1003, in step S1004, determine whether the number of the support group in the selected direction is the same as the number of the support group in the existing selected direction but makes the shown equation (1) smaller. If Yes, keep the selected direction (step S1005). If it is determined No in step S1004, discard the selected direction in step S1007.

After step S1005 or step S1005 is executed, it is determined in step S1006 whether the process has been performed for predetermined iteration times, if no, return back to step S1001, step S1001 and the subsequent processes are performed again. If it is determined in step S1006 that the predetermined iteration times have been reached, the initial estimation of desired OX is obtained.

Now turn to FIG. 8, in step S803, select at least one line segment having a direction closest to the initial estimation direction from a predetermined number of groups of all the groups. As to specific method of judging whether the line is close to the disappearing direction (it is the initial estimation direction of the disappearing direction that is mentioned here), various methods conventionally used in the art may be used, such as methods described in "Video compass", J. Kosecka and W. Zhang, Proceedings of European Conference on Computer Vision, 2002.

In step S804, the disappearing direction OX is determined by using the line segment selected in step S803. Also, methods of determining a disappearing direction according to various line segment sets conventionally used in the art may be used, such as RANSAC method.

Using the method of grouping firstly the line segments obtained by edge detection and then initially estimating the disappearing direction shown in FIG. 8 reduces greatly the computing workload of the system while improving system accuracy.

Figure 11:
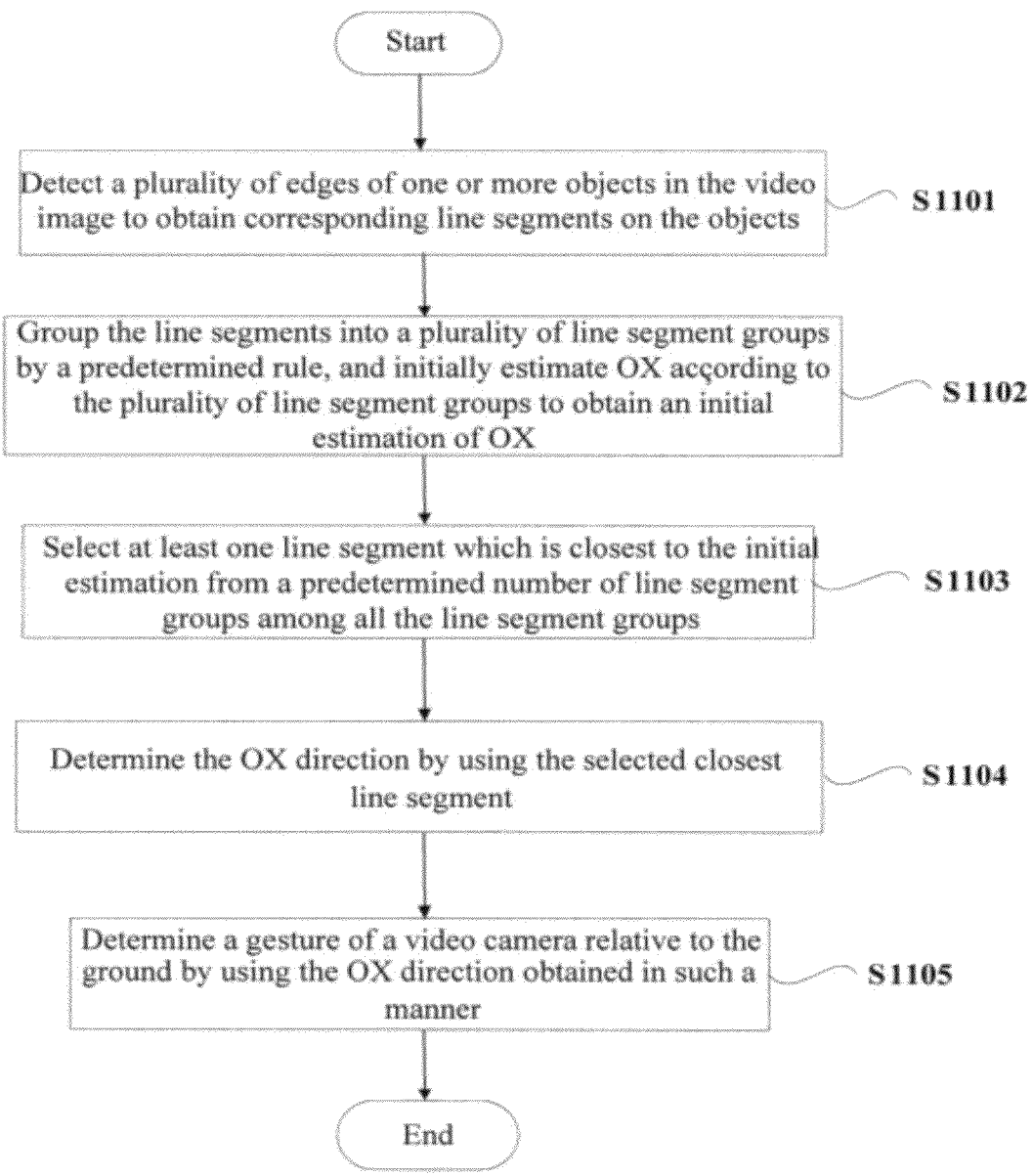
FIG. 11 is a flow chart showing a video camera calibration method according to an embodiment of the invention.

FIG. 11 is a flow chart showing a video camera calibration method according to an embodiment of the invention. Steps S1101 to steps S1104 in FIG. 11 relate to a method of initially estimating the disappearing direction OX using grouped the line segment subsets after grouping the line segment sets obtained by edge detection to thereby determine the disappearing direction OX, for example, processes which are the same as those performed in steps S801 to S804 may be used. Therefore, detailed descriptions are omitted here.

In step S1105, gesture parameters of the video camera, that is, a gesture of a video camera relative to the ground, is determined by using the OX disappearing direction obtained in step S1104 together with other disappearing directions OZ, OY. Example of determining gesture parameter of a video camera based on the disappearing direction will be given hereinafter.

Figure 12:
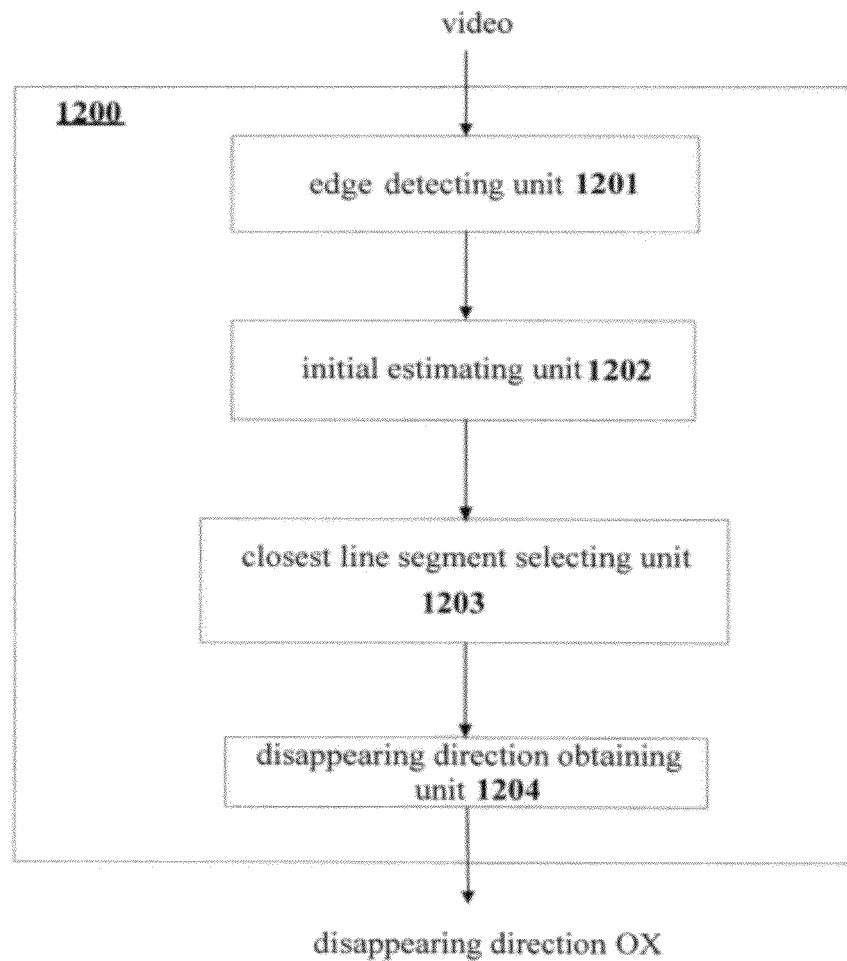
FIG. 12 is a block diagram showing a configuration of a device for determining a disappearing direction according to an embodiment of the invention.

FIG. 12 is a block diagram showing a structure of a device for determining a disappearing direction according to an embodiment of the invention. The disappearing direction determining device 1200 includes an edge detection unit 1201, an initial estimating unit 1202, a closest line segment selecting unit 1203 and a disappearing direction obtaining unit 1204.

At the beginning of the process, a video image shot by a video camera is input into the disappearing direction determining device 1200. The edge detection unit 1201 executes edge detection for an object in the input video image to obtain line segments on the object. The object for edge detection may be still objects like the buildings or moving objects like automobiles or passerby.

In order to reduce the computing amount of the system, especially when the number of the detected edge line segments is quite large, in order to alleviate computing workload of the system, the initial estimating unit 1202 groups the line segments by a predetermined rule, and then initially estimates a disappearing direction in a unit of grouped line segment. The rule for grouping may be prescribed by a design personnel based on requirements, for example, the line segments may be grouped in a unit of circumscribed rectangle of an object in the video image. In the embodiment, the object is a moving object detected from the video image, that is, an automobile that is running on the road.

The initial estimating unit 1202 may initially estimate the disappearing direction OX by introducing vertical restraint using the pre-obtained disappearing direction OZ.

Figure 13:
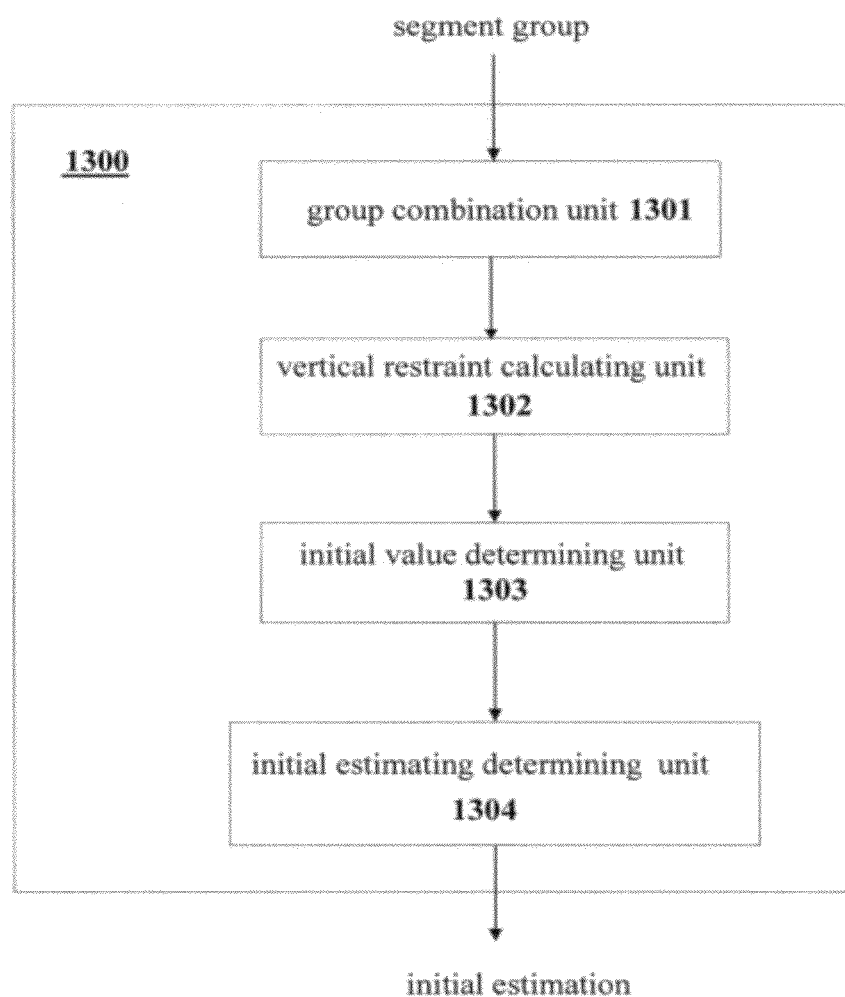
FIG. 13 is a block diagram showing a configuration of an initial estimating unit of the device for determining the disappearing direction according to an embodiment of the invention.

FIG. 13 is a block diagram showing a structure of an initial estimating unit 1300 of the disappearing direction determining device according to an embodiment of the invention. The initial estimating unit 1300 shown in FIG. 13 corresponds to the initial estimating unit 1202 shown in FIG. 12. The initial estimating unit 1300 may comprise a group combination unit 1301, a vertical restraint calculating unit 1302, an initial value determining unit 1303 and an initial estimating determining unit 1304.

The group combining unit 1301 may combine the groups of edge line segments to make each the combination include at least two groups. In the embodiment, the group combining unit 1301 combine every two of the groups.

With respect to the case that each combination in the embodiment includes two groups, the vertical restraint calculating unit 1302, for each of all combinations or partial combinations, calculates outer product of every two of edge plane normal vectors of line segments of different groups each belonging to the combination, and seek an inner product of the calculated outer product and the another disappearing direction OZ perpendicular to the disappearing direction OX.

The initial value determining unit 1303 may compare all inner products calculated by the vertical restraint calculating unit 1302 for the predetermined number of combinations with a threshold T1, and determines a direction of an edge plane normal vector corresponding to an inner product smaller than the threshold T1 as an initial value of the initial estimation of the disappearing direction OX.

The magnitude of threshold T1 is close to 0, and the degree that it is close to 0 reflects a degree that an initial value of initial estimation of the disappearing direction OX is required to be perpendicular to the disappearing direction OZ. It may be selected based on requirement of the preciseness of estimating the disappearing direction, for example, 0.1 may be selected.

Optionally, when each combination includes more than two groups, the vertical restraint calculating unit 1302 and the initial value determining unit 1303 may determine an initial value of the initial estimation of the disappearing direction OX from the number of groups by using least square method.

The initial estimating determining unit 1304 may determine a final initial estimation of the disappearing direction OX using different determining standards by presetting. For example, the initial estimating determining unit 1304 may select an initial value having the maximum number of the support groups among the initial values determined by the initial value determining unit 1303 as a final initial estimation of the disappearing direction OX. Here, a group satisfying the following condition is called as support group: seeking an inner product of the edge plane normal vector of all segments with the obtained initial value, a minimum value of the obtained inner product being smaller than a threshold T2.

Selection of threshold T2 is similar to that of threshold T1, and any value close to 0 may be selected according to preciseness requirement of the disappearing direction.

When there exist initial values with the same number of support groups, the initial estimating determining unit 1304 may select an initial value which makes a target function smallest as the final initial estimation, wherein, the target function may include a measurement of the perpendicular degree of the initial value and the disappearing direction OZ, and a measurement of the parallel degree of the initial value with a line which is most parallel to the initial value in other the support groups.

Specifically, the target function may be selected as the above equation (1), and an initial value which makes the equation (1) the smallest is made as a final initial estimation of the disappearing direction OX.

Now return back to FIG. 12, a closest line segment selecting unit 1203 in the disappearing direction determining device 1200 selects at least one line segment which is closest to the initial estimation from a predetermined number of groups among all the groups of the line segments, and provides the selected line segments to the disappearing direction obtaining unit 1204.

Then, disappearing direction obtaining unit 1204 determines the disappearing direction OX using the selected line segments.

Figure 14:
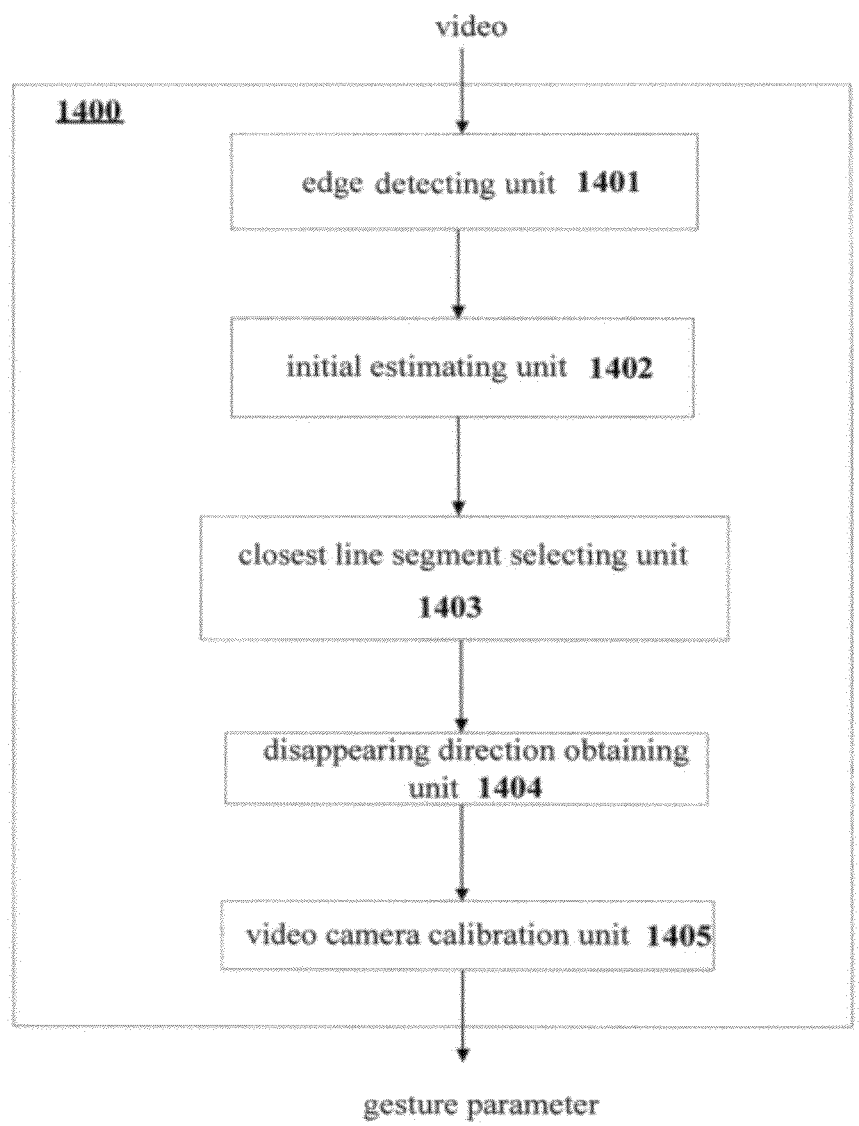
FIG. 14 is a block diagram showing a configuration of an apparatus for a video camera calibration according to an embodiment of the invention.

FIG. 14 is a block diagram showing structure of an apparatus for a video camera calibration according to an embodiment of the invention. The video camera calibration device 1400 comprises an edge detection unit 1401, an initial estimating unit 1402, a closest line segment selecting unit 1403, a disappearing direction obtaining unit 1404 and a video camera calibration unit 1405, wherein, units 1401 to 1404 are used to initially estimate initial direction OX according to group of the line segment sets obtained b edge detection to determine final disappearing direction OX, for example, they may have the same function or structure as those of units 1201 to 1204 shown in FIG. 12. Descriptions thereof are omitted here.

The video camera calibration unit 1405 may determine a gesture of the video camera relative to the ground by using the disappearing direction OX obtained by the disappearing direction obtaining unit 1404 together with another disappearing directions OZ and OY.

The video camera calibration device according to the embodiment of the invention can be mounted or integrated inside a video camera or attached outside the video camera to process the video image shot by the video camera, so as to further perform the video camera calibration.

The method of and device for estimating a disappearing direction OZ pointed by the major moving direction of the moving directions of the moving objects according to movement trajectory of feature points of moving object, and determining horizontal disappearing direction OX by grouping line segment obtained by edge detection are described above respectively. After OZ and OX are obtained, a three-dimensional disappearing direction OY may be obtained by outer product of OZ and OX according to a principle that three axes of a coordinate system are orthogonal to each other. Hereinafter, how to obtain the gesture parameters of a video camera according to the known disappearing directions OX, OZ and OY that is, how to determine a gesture of the video camera relative to the ground, will be described.

As to the embodiment shown in FIG. 1, based on disappearing directions OX, OY and OZ, the rotation angle of the video camera relative to the ground can be obtained by calculation easily. With the known camera height h, the gesture of camera in world coordinate system XYZ can be determined uniquely. At this time, a coordinate of any point in the three-dimensional world coordinate system projected on an image may be calculated by expression (2)

$$\begin{pmatrix} u \\ v \\ 1 \end{pmatrix} = \frac{1}{z} K \left\{ R \begin{pmatrix} x \\ y \\ z \end{pmatrix} + T \right\} \quad (2)$$

Wherein, (x, y, z) are real point coordinates in the three-dimensional world coordinate system, (u, v, 1) are image plane coordinates of the real point coordinate projected on an imaging plane, k is a perspective transform matrix of 3×3 video camera, which can be obtained by correction of the video camera (as to the specific obtaining method, refer to "Flexible Camera Calibration by Viewing a Plane From Unknown Orientations", Z. Zhang, In Proc. of ICCV, 1999), R is rotating matrix of 3×3 video camera, t is a translation matrix of 3×3 video camera. A person skilled in the art appreciates that R and T may be calculated according to disappearing directions OX, OY and OZ and a determined length of segment in the real space (it is the height h of the video camera in the embodiment). On the contrary, as to any pixel on the video camera, if the shooting point is located on ground, the position in the three-dimensional space corresponding to the point can be obtained by inversion calculation of expression (2).

It shall be further indicated that although the height h of the video camera is used as system input in the embodiment to obtain the gesture parameters of the video camera, a person skilled in the art appreciates that the length of any known segment in the real space, or the speed of the known moving object may replace the height h of the video camera to determine the gesture of the video camera relative to the ground.

The method of and device for determining the horizontal disappearing direction OX and the method of and device for determining the ground extending disappearing direction OZ according to embodiments of the invention may be applied to the same implementation. For example, the disappearing directions OX and OZ obtained according to the embodiments of the invention may be both used in the calibration of the video camera. Or, in the specific implementation, for example, in the calibration of the video camera, the beneficial effect of the invention can be obtained by using only one of the disappearing directions OX and OZ determined according to the embodiments of the invention and using another disappearing direction determined by the other methods (for example, various known methods).

Hereinafter, referring to FIG. 15, an example structure of a computer implementing the method and device for determining a disappearing direction and the video camera calibration method and device described according to embodiments of the invention is described.

Figure 15:
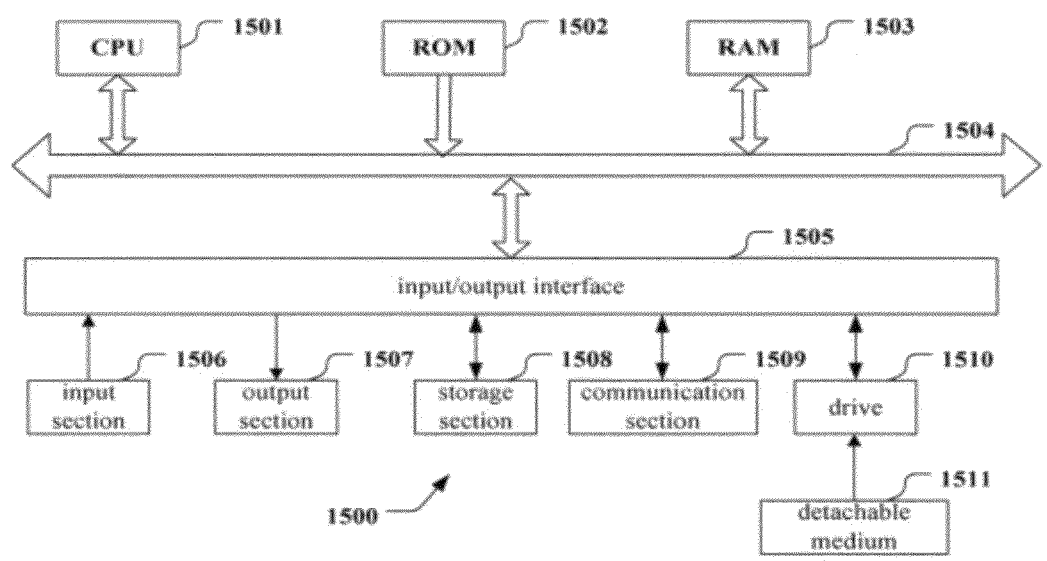
FIG. 15 is a block diagram showing an example configuration of a computer implementing the invention.

In FIG. 15, a central processing unit (CPU) 1501 performs various processes according to the program stored in the Read-Only Memory (ROM) 1502 or programs loaded from the storage section 1508 to the Random Access Memory (RAM) 1503. In the RAM 1503, store also data required when the CPU 1501 performs various processes.

CPU 1501, ROM 1502 and RAM 1503 are connected from one to another via a bus 1504. Input/output interface 1505 is also connected to the bus 1504.

The following components are connected to the input/output interface 1505: an input section 1506, including a keyboard, a mouse, etc.; an output section 1507, including a display, such as a cathode ray tube (CRT), a liquid crystal display (LCD), etc., and a speakers and so on; a storage section 1508, including a hard disc, etc.; and a communication section 1509, including network interface cards such as LAN cards, modems and so on. The communication section 1509 performs a communication process via network like the internet.

According to requirements, a drive 1510 is also connected to the input/output interface 1505. A detachable medium 1511 such as disc, CD, magneto-optical disc, semiconductor memory, and so on is installed on the drive 1510 based on requirements, such that the computer program read out therefrom is installed in the storage section 1508 based on requirements.

In case of implementing the above steps and processes by software, programs constituting the software are installed from a network like the Internet or from a storage medium like the detachable medium 1511.

A person skilled in the art should be understood that such storage medium is not limited to the detachable medium 1511 which is stored with programs and distributes separately from the method to provide a user with program as shown in FIG. 15. The example of the detachable medium 1511 includes disc, CD (including CD read only memory (CD-ROM) and digital versatile disc (DVD)), magneto-optical disc (including mini-disc (MD)) and semiconductor memory. Alternatively, the storage medium may be ROM 1502, or hard disc included in the storage section 1508 in which a program is stored and the program is distributed to a user with the method including the same.

The method and device according to embodiments of the invention may be applied to many fields. Such as:

Example 1

Measuring a Size of an Object on Ground

Since the positions of all points on a video image in a three-dimensional space can be calculated by expression (2), the actual size of an object on ground may be calculated by the method and device provided in the invention from the size of an object on ground, for example, the size of a person, the size of a vehicle, etc.

Example 2

Measuring a Speed of a Moving Object

By detecting the position of a moving object on an image on ground at two time points, distance that the object moves in the three-dimensional space may be measured by the method and device provided in the invention to obtain moving speed of the object by further dividing the time. The measuring result may be further used to judge occurrence of traffic violation such as over-speed.

The invention has been descried by referring to the specific embodiments in the above description. However, one of ordinary skills in the art shall be understood that many changes and variations of the invention can be made without departing from the scope and spirit of the claims.

What is claimed is:

1. A device for determining a disappearing direction, comprising:
    circuitry configured to:
    detect a plurality of edges of one or more objects in a video image to obtain corresponding line segments on the one or more objects;
    group the line segments into a plurality of line segment groups by a predetermined rule, initially estimate the disappearing direction according to the plurality of the line segment groups, and obtain an initial estimation of the disappearing direction;
    select at least one line segment which is closest to the initial estimation from a predetermined number of the line segment groups among all the line segment groups; and
    determine the disappearing direction using the selected at least one line segment, wherein the circuitry is configured to
    initially estimate the disappearing direction by using a second disappearing direction perpendicular to the disappearing direction to be estimated, and
    combine the line segment groups into one or more combinations, each combination including at least two groups.

2. The device for determining the disappearing direction according to claim 1, wherein, the predetermined rule is: line segments of a same object in the video image are grouped into a same line segment group.

3. The device for determining the disappearing direction according to claim 1,
    wherein, each combination includes a first group and a second group, and
    wherein the circuitry is configured to
        for each combination in a predetermined number of combinations in all combinations, calculate an outer product of edge plane normal vectors of every two line segments respectively of the first group and the second group, and seek an inner product of the calculated outer product and the second disappearing direction; and
        compare all calculated inner products for the predetermined number of combinations with a first threshold, and determine a direction of an edge plane normal vector corresponding to any inner product smaller than the first threshold as an initial value of the initial estimation of the disappearing direction.

4. The device for determining the disappearing direction according to claim 3,
    wherein, the circuitry is configured to select, from determined initial values, a final initial value with a maximum number of support groups as a final value of the initial estimation of the disappearing direction, and
    wherein, for each support group, a minimum inner product in all the inner products calculated with the initial value and edge plane normal vectors of all line segments in the support group, is smaller than a second threshold.

5. The device for determining the disappearing direction according to claim 4,
    wherein, when there are more than one initial value with a same maximum number of support groups, the circuitry is configured to select the final initial value which makes a target function smallest as the final value of the initial estimation, and
    wherein, the target function includes a measurement of a perpendicular degree between the initial value and the second disappearing direction, and a measurement of a parallel degree between the initial value and line segments most parallel to the initial value in other support groups.

6. The device for determining the disappearing direction according to claim 5,
    wherein, the target function is:

$$f(OX) = OX \cdot OZ + \frac{1}{N(S)} \sum_{i \in S} \min_j (OX \cdot L_j), \text{ and}$$

wherein OX is representative of the initial value of the initial estimation of the disappearing direction, OZ is representative of the second disappearing direction, N(S) is the number of support groups, $$\sum_{i \in S}$$

is to sum all support groups, $$\min_j (OX \cdot L_j)$$

is to seek a minimum value of inner products of the initial value of OX and edge plane normal vectors of all segments Lj in support group i.

7. A method of determining a disappearing direction, comprising:
    detecting a plurality of edges of one or more objects in a video image to obtain corresponding line segments on the one or more objects;
    grouping the line segments into a plurality of line segment groups by a predetermined rule, and initially estimating the disappearing direction according to the plurality of the line segment groups to obtain an initial estimation of the disappearing direction;
    selecting at least one line segment which is closest to the initial estimation from a predetermined number of the line segment groups among all the line segment groups; and
    determining the disappearing direction by using the selected at least one line segments, wherein
    the disappearing direction is initially estimated by using a second disappearing direction perpendicular to the disappearing direction to be estimated, and
    the line segment groups are combined into one or more combinations, each combination including at least two groups.

8. A non-transitory computer program product, comprising program codes which, when executed by a processor of a computer, cause the processor to perform a method comprising:
    detecting a plurality of edges of one or more objects in an input video image to obtain corresponding line segments on the one or more objects;

grouping the line segments into a plurality of line segment groups by a predetermined rule, and initially estimating the disappearing direction according to the plurality of the line segment groups to obtain an initial estimation of the disappearing direction;

selecting at least one line segment which is closest to the initial estimation from a predetermined number of the line segment groups among all the line segment groups; and determining a disappearing direction by using the selected at least one line segment, wherein the disappearing direction is initially estimated by using a second disappearing direction perpendicular to the disappearing direction to be estimated, and the line segment groups are combined into one or more combinations, each combination including at least two groups.

* * * * *